(12) United States Patent
Ueno

(10) Patent No.: US 6,591,699 B2
(45) Date of Patent: Jul. 15, 2003

(54) TEMPERATURE COMPENSATOR OF TORQUE SENSOR

(75) Inventor: Takayuki Ueno, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/092,265

(22) Filed: Mar. 6, 2002

(65) Prior Publication Data

US 2003/0029251 A1 Feb. 13, 2003

(30) Foreign Application Priority Data

Aug. 7, 2001 (JP) ........................................ 2001-239114

(51) Int. Cl.[7] ................................................. G01L 3/02
(52) U.S. Cl. ................................................. 73/862.331
(58) Field of Search ..................... 73/862.331, 862.332, 73/862.333, 779, 862.193, 862.69

(56) References Cited

U.S. PATENT DOCUMENTS

| | | | |
|---|---|---|---|
| 4,791,839 A | * | 12/1988 | Bickford et al. ............... 73/761 |
| 5,307,690 A | * | 5/1994 | Hanazawa ............. 73/862.331 |
| 5,412,998 A | * | 5/1995 | Nakamoto et al. ..... 73/862.333 |

FOREIGN PATENT DOCUMENTS

JP          721433          3/1995

* cited by examiner

*Primary Examiner*—Max Noori
(74) *Attorney, Agent, or Firm*—Orum & Roth

(57) ABSTRACT

In a temperature-compensating device of a torque sensor including a pair of coils in which inductance change in opposite directions corresponds to torque and a torque detecting means for outputting torque detection voltages from first and second voltages based on change in inductance of each of the pair of the coils, the torque detecting means having

- an adding means for adding the first voltage to the second voltage and outputting as a temperature detection voltage,
- a memory means for memorizing temperature characteristic of the temperature detection voltage of the adding means preliminarily measured, and
- a correcting means for correcting the torque detection voltage with a temperature detected from the temperature detection voltage outputted by the adding means according to the temperature characteristic.

20 Claims, 4 Drawing Sheets

TEMPERATURE COMPENSATOR OF TORQUE SENSOR

BACKGROUND OF THE INVENTION

1. Field of the Invention

The present invention relates to a temperature-compensator of a torque sensor which detects a torque on the basis of each inductance change of a pair of coils.

2. Description of the Related Art

In the torque sensor, the coil itself has temperature characteristics and changes in the temperature due to thermal expansion of a component of the torque sensor. For example, its entire housing or the like affect torque detection output thereby disturbing detection of an accurate torque.

Thus, the torque sensor is provided with a temperature sensor dedicated for detecting the temperature of the same torque sensor such as a thermister so as to correct the value of a detected torque according to a detected temperature of the temperature sensor.

The thermister needs to be provided on the torque sensor so as to detect the temperature thereof with an excellent sensibility for the temperature. Therefore, a substrate or a holding component for holding the thermister is required, so that the quantity of required components increases leading to an increase of cost.

SUMMARY OF THE INVENTION

The present invention has been achieved in views of those problems. An object of the present invention is to provide a temperature-compensating device capable of compensating for the temperature of a torque sensor without use of any temperature sensor dedicated for temperature detection, wherein reduction of cost can be achieved by reducing the quantity of required parts.

According to the present invention, there is disclosed a temperature-compensating device of a torque sensor including a pair of coils in which inductance change in opposite directions corresponding to torque and a torque detecting means for outputting torque detection voltages from first and second voltages based on a change in inductance of each of the pair of the coils. The torque detecting means contains an adding means for adding the first voltage to the second voltage and outputting as a temperature detection voltage. The torque detecting means contains a memory means for memorizing temperature characteristics of the temperature detection voltage of the adding means preliminarily measured. The torque detecting means also contains a correcting means for correcting the torque detection voltage with a temperature detected from the temperature detection voltage outputted by the adding means according to the temperature characteristics.

BRIEF DESCRIPTION OF THE DRAWINGS

The present invention will be more fully understood from the detailed description given below and from the accompanying drawings which should not be taken to be a limitation on the invention, but are for explanation and understanding only.

DESCRIPTION OF THE PREFERRED EMBODIMENTS

One embodiment of the present invention is described below with reference to FIG. 1 to FIG. 4.

Figure 1:
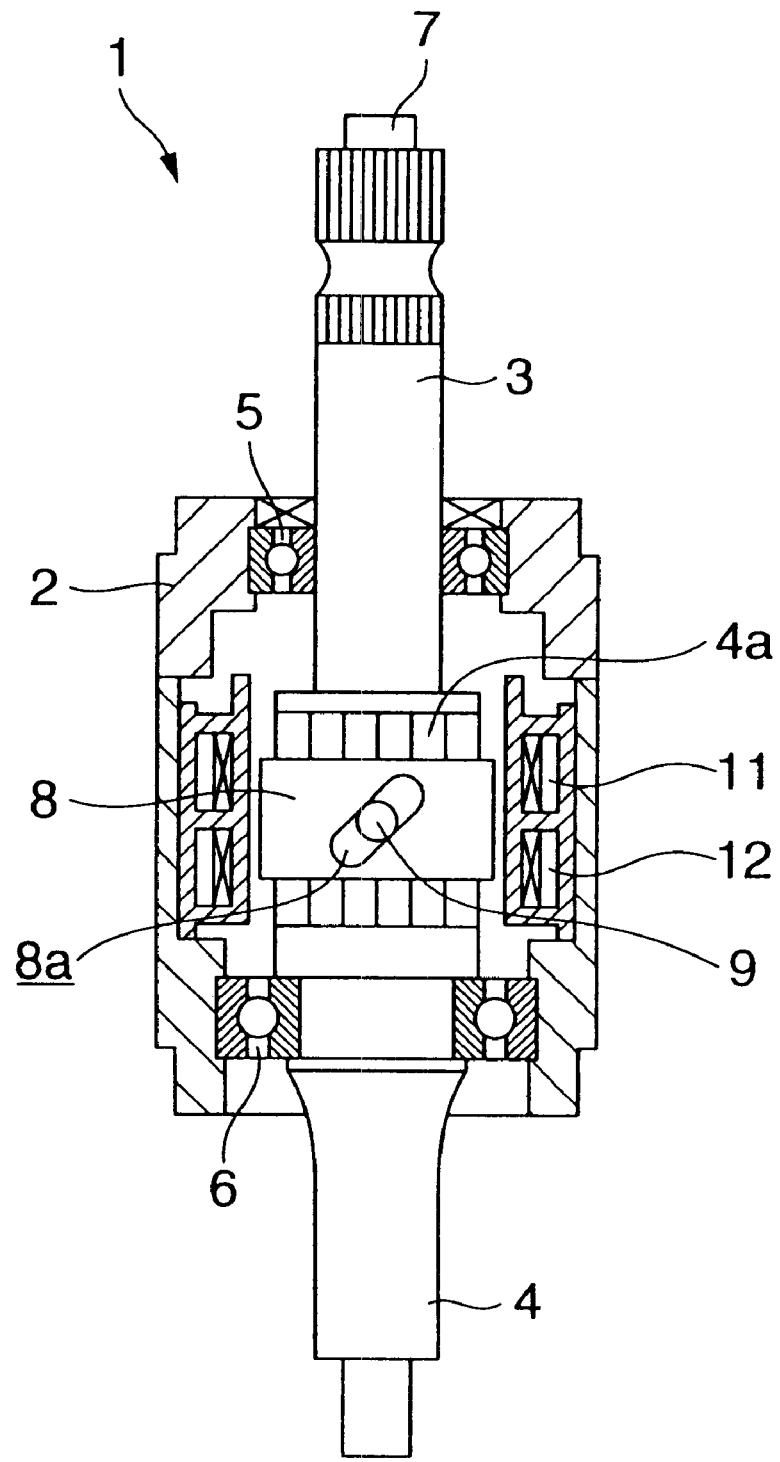
FIG. 1 is a view schematically showing a construction of mechanical parts of a torque sensor according to one embodiment of the present invention.

A torque sensor 1 of this embodiment is applied to a power steering system for a vehicle, and FIG. 1 schematically shows a structure of the torque sensor 1.

An input shaft 3 and an output shaft 4 are rotatably supported via bearings 5 and 6, and coaxially inserted into a housing 2, and are connected by a torsion bar 7 therein.

A cylindrical core 8 is fitted onto a serrated outer peripheral surface of a large-diameter end portion 4a of the output shaft 4, and is provided so as to be slidable in only an axial direction with respect to the output shaft 4. A slider pin 9 projected from the input shaft 3 is fitted into a spiral groove 8a of the core 8 in a circumferential direction of the large-diameter end portion 4a through a long slot.

Two torque detecting coils 11 and 12 supported in the housing 2 are provided at an outer periphery of the cylindrical core 8 slidable along an axial direction via a space.

These two coils 11 and 12 are arranged at a side opposite to each other with respect to the center of the axial direction of the slidable core 8.

When a torsional stress acts on the input shaft 3, a rotating force is transmitted to the output shaft 4 via the torsion bar 7, and then, the torsion bar 7 is elastically deformed. As a result, a relative displacement of a rotating direction is generated between the input shaft 3 and the output shaft 4.

The relative displacement of the rotating direction slides the core 8 to the axial direction by an engagement of the slider pin 9 and the spiral groove 8a.

When the core 8 is moved to the axial direction, each area of the coils 11 and 12 surrounding the core 8 varies, and there is a relation such that when an area of one coil surrounding the core 8 increases, an area of the other coil surrounding the core 8 decreases.

When the area surrounding the core 8 increases, a magnetic loss increases; therefore, inductance of the coil decreases. Conversely, when the area surrounding the core 8 decreases, a magnetic loss decreases; therefore, inductance of the coil increases.

Accordingly, in the case where a torque of moving the core 8 to the coil 11 side acts, an inductance L1 of the coil 11 decreases, and an inductance L2 of the coil 12 increases. Conversely, in the case where a torque of moving the core 8 to the coil 12 side acts, an inductance L1 of the coil 11 increases, and an inductance L2 of the coil 12 decreases.

Figure 2:
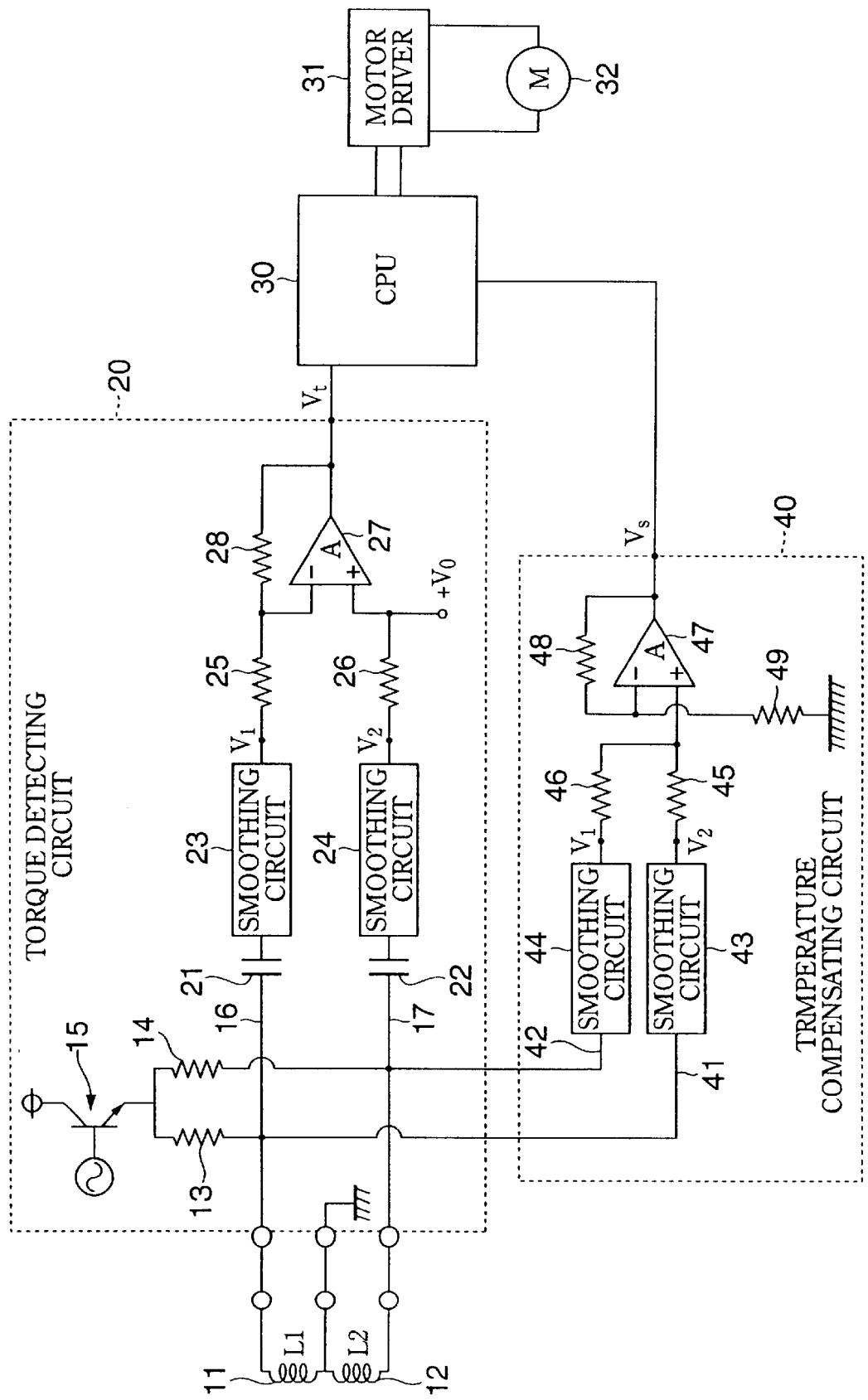
FIG. 2 is a schematic structure diagram of an electric circuit of the same torque sensor.

FIG. 2 shows a schematic structure diagram of an electric circuit for detecting a torque based on changes in inductance L1, L2 of coils 11, 12 in this torque sensor 1.

The coils 11, 12 are connected through each end, and signal lines from that connection terminal and the other ends are extended and connected to connecting terminals of a torque detecting circuit 20 disposed in an electric control unit ECU.

In the torque detecting circuit 20, the connecting terminal between the coils 11 and 12 is grounded while the other ends are connected to an emitter terminal of a transistor 15 through resistors 13, 14.

In the transistor 15, a constant voltage is applied to its collector terminal while AC voltage is inputted to its base terminal.

A voltage signal line 16 extended from a connecting portion between the coil 11 and the resistor 13 is connected to a smoothing circuit 23 through a capacitor 21. A voltage signal line 17 extended from a connecting point between the coil 12 and the resistor 14 is connected to a smoothing circuit 24 through a capacitor 22.

A bridge circuit is comprised of the coils 11, 12 and the resistors 13, 14, and an oscillation voltage is inputted to that bridge circuit. Output voltages from that circuit are inputted to the smoothing circuits 23, 24 and smoothed and outputted as first and second voltages $V_1$, $V_2$.

The first and second voltages $V_1$, $V_2$ are inputted to an inversion input terminal and a non-inversion input terminal of a differential amplifier 27, which is an operational amplifier, through the resistors 25, 26.

Negative feedback is applied to the differential amplifier 27 by the resistor 28 so that it functions as a differential amplifier. Its output is inputted to CPU 30 as a torque detection voltage Vt.

Bias voltage $V_0$ is inputted to the non-inversion input terminal of the differential amplifier 27.

Therefore, the differential amplifier 27 amplifies a difference between the first voltage $V_1$ and the second voltage $V_2$ by A times, and outputs this plus the bias voltage $V_0$ as torque detection voltage Vt.

That is, the torque detection voltage Vt is $Vt=(V_1-V_2)A+V_0$.

A torque detection voltage Vt during neutral time which is not deflected to either right steering torque (torsion torque in the right direction) or left steering torque (torsion torque in the left direction) is called neutral point voltage and the aforementioned bias voltage $V_0$ at the normal time is the neutral point voltage.

This torque sensor 1 has the above-described schematic circuit structure. The operation thereof will be described with reference to FIGS. 3A and 3B showing behaviors of the first and second voltages $V_1$, $V_2$ and the torque detection voltage Vt.

Figure 3A:
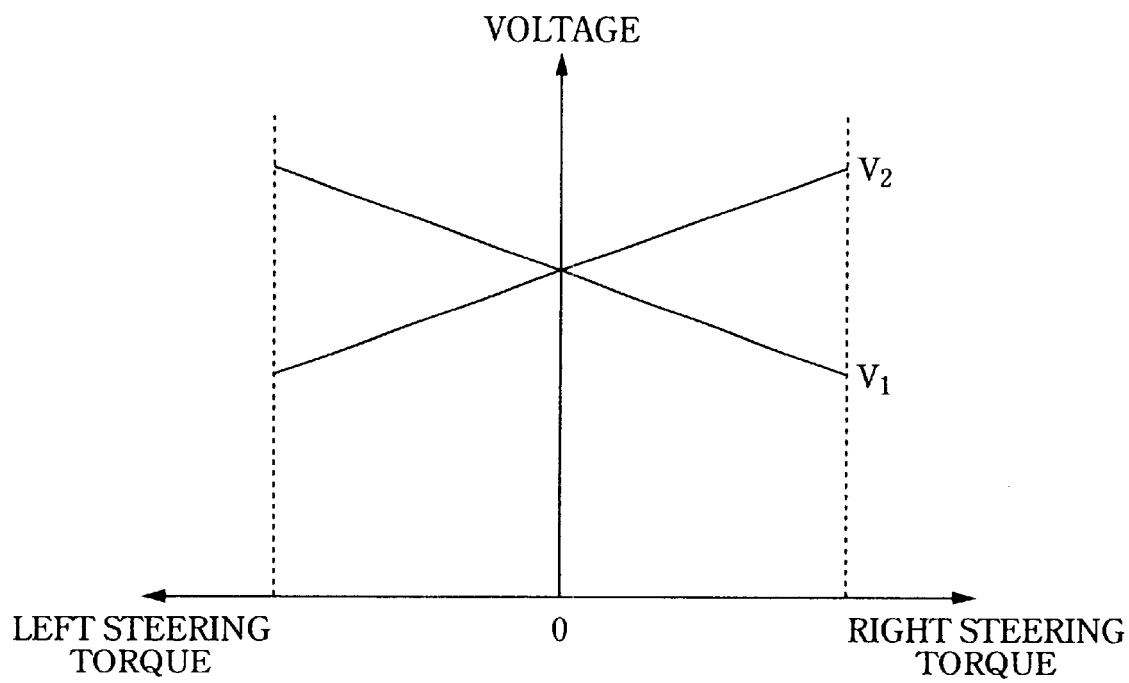
FIGS. 3A and 3B are diagrams showing first and second voltages and torque detecting voltages at normal time.
Figure 3B:
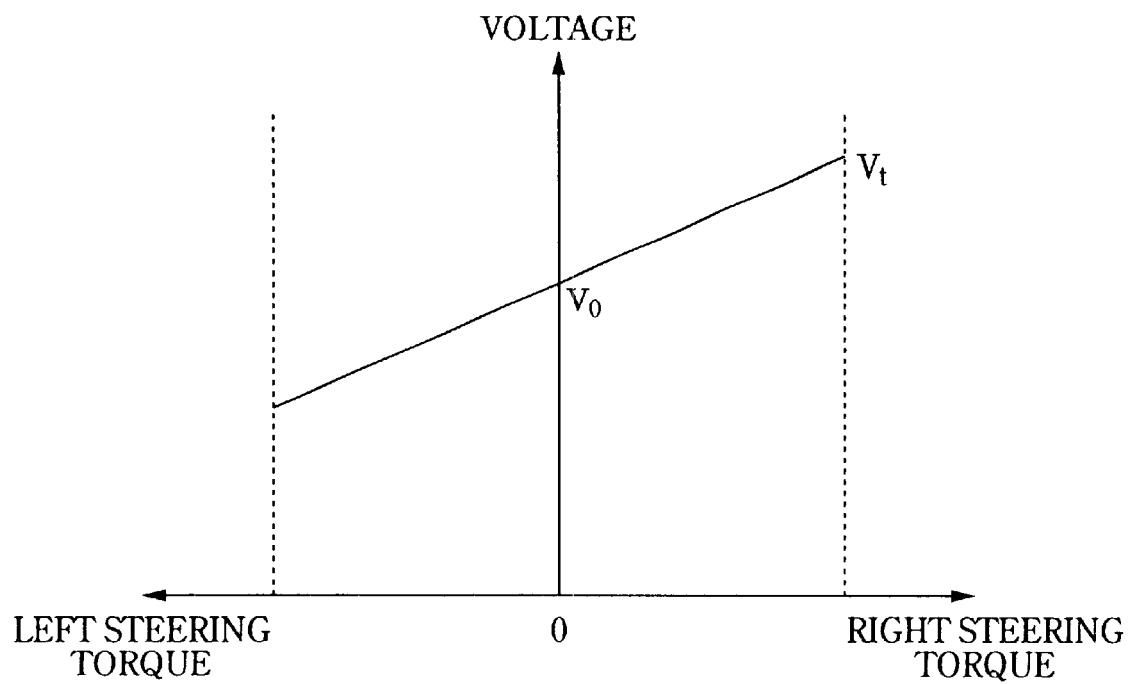

In coordinates shown in FIGS. 3A and 3B, its ordinate axis indicates voltage, rightward in the abscissa axis indicates right steering torque and leftward therein indicates left steering torque, while home position 0 indicates the neutral point.

FIGS. 3A and 3B indicate a condition in which the torque sensor 1 is operated normally. If the right steering torque is increased, a core 8 moves toward the coil 11 due to a relative rotation between the input shaft 3 and the output shaft 4. Consequently, the inductance L2 of the coil 12 is increased so as to increase induced electromotive force and conversely decreases the inductance L1 of the coil 11 so as to decrease induced electromotive force. As a result, the second voltage $V_2$ is increased while the first voltage $V_1$ is decreased (see FIG. 3A).

If the left steering torque is increased, conversely, the second voltage $V_2$ is decreased while the first voltage $V_1$ is increased (see FIG. 3A).

The torque detection voltage Vt, which is an output of the differential amplifier 27 gained by multiplying the difference between both by A times and then adding the bias voltage, is a rightward rising inclined line which passes the bias voltage $V_0$ at the neutral point shown in FIG. 3B.

The right and left steering torque can be detected according to the inclined line of the torque detection voltage Vt shown in FIG. 3B.

The CPU 30 outputs a motor control instruction signal to a motor driver 31 based on the torque detection voltage Vt, so that a motor 32 which assists steering is driven by the motor driver 31.

In this manner, assistance of the motor 32 depending on the steering torque is obtained in the steering operation.

In the power steering control mechanism described above, influence upon the torque sensor 1 by temperature cannot be avoided.

Because the torque detection voltage Vt is obtained based on the difference between the first voltage $V_1$ and the second voltage $V_2$, changes in temperature of the respective coils 11, 12 are offset by each other so that they hardly affect the torque detection voltage Vt. However, distortions of structural components such as the core 8 of the torque sensor 1, a slider pin 9, and housing 2, due to thermal expansion, affect the first and second voltages $V_1$, $V_2$ individually, so that the torque detection voltage Vt is changed. Consequently, no accurate torque can be obtained.

For these reasons, this torque sensor 1 is provided with a temperature compensating circuit 40.

As shown in FIG. 2, voltage signal lines 41, 42 branched from the voltage signal lines 16, 17 are connected to smoothing circuits 43, 44 and the respective smoothing circuits 43, 44 are connected through resistors 45, 46. Its connecting point is connected to a non-inversion input terminal of an adder 47, which is an operational amplifier.

An inversion input terminal of the adder 47 is connected to an output terminal through a resistor 48, and grounded through a resistor 49. The adder 47 outputs a sum $V_1+V_2$ of the first and second voltage $V_1$, $V_2$, which are input voltages, to the CPU 30 as the temperature detection voltage Vs.

According to the characteristic of the first, second voltages $V_1$, $V_2$ shown in the graph of FIG. 3A, the temperature detection voltage Vs, which is a sum $V_1+V_2$ indicates a substantially constant value with respect to the steering torque if the temperature is constant.

The temperature characteristic of the temperature detection voltage Vs, which is an output of this adder 47, is measured preliminarily.

Figure 4:
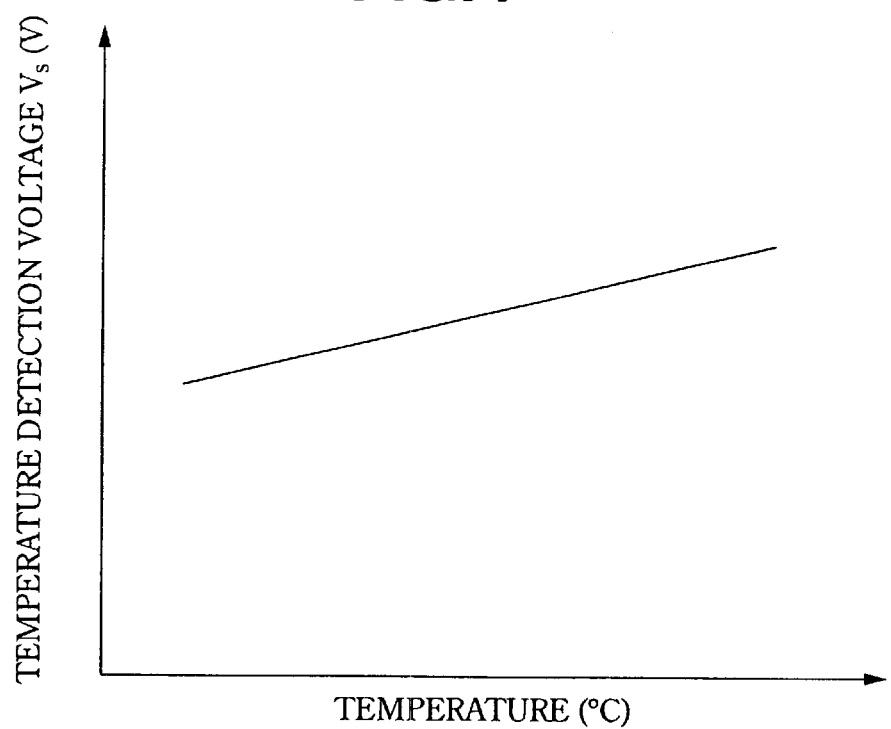
FIG. 4 is a diagram showing the temperature characteristics of a temperature detecting voltage.

FIG. 4 shows a result of measurement of the temperature detection voltage Vs executed by changing the temperature with the right and left steering in neutral condition.

This temperature characteristic result enables the obtainment of a temperature corresponding to a temperature detection voltage Vs, and this temperature characteristic is memorized in the CPU 30.

If the temperature detection voltage Vs is inputted to the CPU 30 from the temperature compensating circuit 40, the CPU 30 corrects a torque detection voltage Vt inputted individually based on a temperature obtained according to the memorized temperature characteristic. This results in accurate detection of steering torque, which is not affected by a temperature change dependent of other components than temperature change of the coil itself, and employs this steering torque in order to drive the motor 32.

As for correction of the torque detection voltage Vt, the temperature characteristic of the torque detection voltage $Vt_0$ when the right and left steering are in neutral condition is measured and memorized in the CPU 30.

Figure 5:
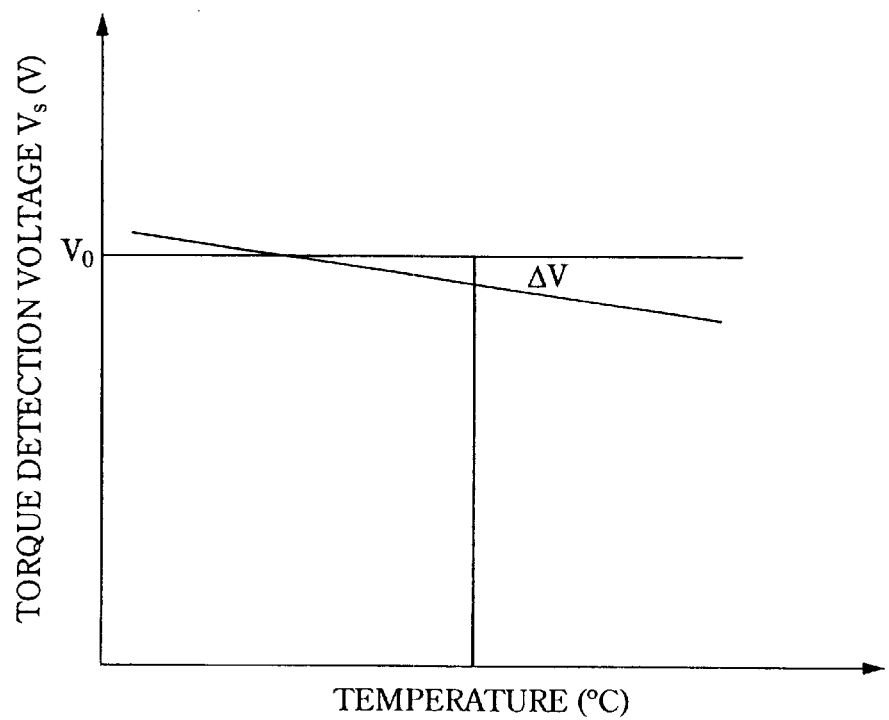
FIG. 5 is a diagram showing the temperature characteristic of the torque detecting voltage in a neutral state.

FIG. 5 shows the temperature characteristic of the torque detection voltage $Vt_0$ in neutral condition.

Although a normal voltage in the neutral condition of the torque detection voltage Vt is as constant as the bias voltage $V_0$, an inclined temperature characteristic curve (substantially linear) is indicated because a deflection is generated by an influence of the temperature.

If a temperature is detected from the temperature detection voltage Vs as described above, a difference in voltage $\Delta V (=Vt_0-V_0)$ between that torque detection voltage $Vt_0$ and the bias voltage $V_0$ is obtained according to the temperature characteristic shown in FIG. 5.

The torque detection voltage Vt actually detected by the torque detecting circuit 20 is corrected to $Vt+\Delta V$ by adding this difference in voltage $\Delta V$.

A real steering torque is detected from this corrected torque detection voltage $Vt+\Delta V$ based on FIG. 3B.

The temperature-compensating device of the torque sensor 1 of this embodiment is so constructed as described above. The temperature compensating circuit 40 may be disposed in the ECU or the like and does not have to be installed in the torque sensor.

For such reason, no special board or holding part is necessary so that the number of required parts can be reduced, thereby achieving reduction of production cost.

Because a temperature sensor such as a thermister dedicated for temperature detection is not employed, a further reduction of production cost is achieved.

Although according to the above-described embodiments, the temperature detection voltage Vs is inputted to the CPU 30, it is permissible to change this temperature detection voltage Vs appropriately and input it directly to the non-inversion input terminal of the differential amplifier 27 of the torque detecting circuit 20 as a bias voltage. This would keep the torque detection voltage Vt in a predetermined relation with steering torque (see FIG. 3B).

The first and second voltage $V_1$, $V_2$, which are to be inputted to the non-inversion input terminal of the adder 47 of the temperature compensating circuit 40, may be inputted from outputs of the smoothing circuits 23, 24 of the torque detection circuit 20 (the capacitors 21, 22 are omitted in this case). Consequently, the smoothing circuits 43, 44 of the temperature compensating circuit 40 can be omitted, thereby making it possible to reduce the quantity of required parts.

As heretofore explained, embodiments of the present invention have been described in detail with reference to the drawings. However, the specific configurations of the present invention are not limited to the embodiments but those having a modification of the design within the range of the present invention are also included in the present invention.

According to the present invention, a temperature-compensating device of a torque sensor includes a pair of coils in which inductance change in opposite directions corresponding to torque, and a torque detecting means for outputting torque detection voltages from first and second voltages based on change in inductance of each of the pair of the coils. The torque detecting means contains an adding means for adding the first voltage to the second voltage and outputting as a temperature detection voltage. The torque detecting means has a memory means for memorizing a temperature characteristic of the temperature detection voltage of the adding means preliminarily measured. The torque detecting means also contains a correcting means for correcting the torque detection voltage with a temperature detected from the temperature detection voltage outputted by the adding means according to the temperature characteristic.

The adding means for outputting the temperature detection voltage for detecting a temperature may employ the first and second voltages from a pair of coils of the torque sensor as an input, and therefore may not be installed on the torque sensor. As a result, no special circuit board or holding component is necessary, thereby leading to reduction of the quantity of parts and production cost.

Further, because no special temperature sensor for detecting the temperature is used, a further reduction of cost can be achieved.

According to the present invention, the temperature-compensating device of the torque sensor includes a feature that the torque detecting means obtains a difference in voltage between the first voltage and second voltage so as to employ this difference in voltage as the torque detection voltage.

Therefore, although each inductance of a pair of the coils of the torque sensor has a temperature characteristic, because the difference in voltage between the first voltage and the second voltage depending on induced electromotive force of each coil is employed as torque detection voltage, the changes in temperature of the respective coils are offset by each other and do not affect the torque detection voltage.

A further feature of the present invention is that in the temperature-compensating device of the torque sensor, the adding means is an operational amplifier.

Because the operational amplifier, which is a general component, is used instead of a temperature sensor dedicated for temperature detection such as the thermister, reduction of cost can be achieved.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A temperature compensating device of a torque sensor including a pair of sensing coils in which inductance change in opposite directions corresponds to torque and a torque detecting means for outputting torque detection voltages from first and second voltages based on change in inductance of each of the pair of coils, the torque detecting means further comprising:

a torque detection circuit and a temperature compensating circuit;

said temperature compensating circuit comprising an adding means adding the first voltage to the second voltage, so as to output as a temperature detection voltage;

a memory means for memorizing a temperature characteristic of the temperature detection voltage of the adding means preliminarily measured; and a correcting means for correcting the torque detection voltage with a temperature detected from the temperature detection voltage outputted by the adding means according to the temperature characteristic;

the elements of the torque detecting circuit and the temperature compensating circuit are arranged and constructed to determine the temperature detection voltage and the torque detection voltage without a dedicated temperature sensor element; and wherein the temperature compensating device detects and utilizes temperature information without a dedicated temperature sensor element.

2. A temperature-compensating device of a torque sensor as claimed in claim 1, wherein the torque detecting means obtains a difference in voltage between the first and second voltages and employs the same difference in voltage as the torque detection voltage.

3. A temperature-compensating device of a torque sensor as claimed in claim 1, wherein the adding means is an operational amplifier.

4. A temperature-compensating device of a torque sensor as claimed in claim 2, wherein the adding means is an operational amplifier.

5. A temperature-compensating device of a torque sensor as claimed in claim 1, wherein the first and second voltages are obtained by inputting an oscillation voltage into a bridge circuit comprised of the pair of the coils and resistors and smoothing output voltages thereof with each smoothing circuit.

6. A temperature-compensating device of a torque sensor as claimed in claim 2, wherein the first and second voltages are obtained by inputting an oscillation voltage into a bridge circuit comprised of the pair of the coils and resistors and smoothing output voltages thereof with each smoothing circuit.

7. A temperature-compensating device of a torque sensor as claimed in claim 3, wherein the first and second voltages are obtained by inputting an oscillation voltage into a bridge circuit comprised of the pair of the coils and resistors and smoothing output voltages thereof with each smoothing circuit.

8. A temperature-compensating device of a torque sensor as claimed in claim 4, wherein the first and second voltages are obtained by inputting an oscillation voltage into a bridge circuit comprised of the pair of the coils and resistors and smoothing output voltages thereof with each smoothing circuit.

9. A temperature-compensating device of a torque sensor as claimed in claim 3, wherein the operational amplifier is a differential amplifier in which the first voltage is inputted to any one of an inversion input terminal and a non-inversion input terminal of the differential amplifier and the second voltage is inputted to the other one, with negative feedback applied to an inversion input terminal and bias voltage applied to a non-inversion input terminal.

10. A temperature-compensating device of a torque sensor as claimed in claim 4, wherein the operational amplifier is a differential amplifier in which the first voltage is inputted to any one of an inversion input terminal and a non-inversion input terminal of the differential amplifier and the second voltage is inputted to the other one, with negative feedback applied to an inversion input terminal and bias voltage applied to a non-inversion input terminal.

11. The temperature compensating device of a torque sensor as claimed in claim 5, wherein the bridge circuit is connected to an emitter terminal of a transistor.

12. A temperature compensating device of a torque sensor including a pair of sensing coils in which inductance change in opposite directions corresponds to torque and a torque detecting means for outputting torque detection voltages from first and second voltages based on change in inductance of each of the pair of coils, the torque detecting means further comprising:

an adding means adding the first voltage to the second voltage, so as to output as a temperature detection voltage;

a memory means for memorizing a temperature characteristic of the temperature detection voltage of the adding means preliminarily measured; and a correcting means for correcting the torque detection voltage with a temperature detected from the temperature detection voltage outputted by the adding means according to the temperature characteristic;

wherein the first and second voltages are obtained by inputting an oscillation voltage into a bridge circuit comprised of the pair of the coils and resistors and smoothing output voltages thereof with at least one smoothing circuit.

13. A temperature compensating device of a torque sensor as claimed in claim 12, wherein the torque detecting means obtains a difference in voltage between the first and second voltages and employs the same difference in voltage as the torque detection voltage.

14. A temperature compensating device of a torque sensor as claimed in claim 12, wherein the adding means is an operational amplifier.

15. A temperature compensating device of a torque sensor as claimed in claim 13, wherein the adding means is an operational amplifier.

16. The temperature compensating device of a torque sensor as claimed in claim 12, wherein the bridge circuit is connected to an emitter terminal of a transistor.

17. The temperature compensating device of a torque sensor as claimed in claim 12 wherein the temperature compensating device detects and utilized temperature information without a dedicated temperature sensor element.

18. The temperature compensating device of a torque sensor as claimed in claim 15 wherein the temperature compensating device detects and utilized temperature information without a dedicated temperature sensor element.

19. A temperature compensating device of a torque sensor including a pair of sensing coils in which inductance change in opposite directions corresponds to torque and a torque detecting means for outputting torque detection voltages from first and second voltages based on change in inductance of each of the pair of coils, the torque detecting means further comprising:

an adding means adding the first voltage to the second voltage, so as to output as a temperature detection voltage;

a memory means for memorizing a temperature characteristic of the temperature detection voltage of the adding means preliminarily measured;

a first smoothing circuit for smoothing the first voltage and a second smoothing circuit for smoothing the second voltage; and a correcting means for correcting the torque detection voltage with a temperature detected from the temperature detection voltage outputted by the adding means according to the temperature characteristic, wherein the temperature compensating device detects and utilizes temperature information without a dedicated temperature sensor element.

20. A temperature compensating device of a torque sensor including a pair of coils in which inductance change in opposite directions corresponds to torque and a troque detecting means for outputting torque detection voltages from first and second voltages for detection of the temperature based on change in inductance of each of the pair of the coils, the torque detecting means further comprising:

an adding means adding the first voltage for detection of the temperature to the second voltage for detection of the temperature, which are outputted from a bridge circuit based on change in inductance of each of the pair of the coils, so as to output as a temperature detection voltage;

a memory means for memorizing a temperature characteristic of the temperature detection voltage of the adding means preliminarily measured; and a correcting means for correcting the torque detection voltage with a temperature detected from the temperature detection voltage outputted by the adding means according to the temperature characteristic.

* * * * *